(12) United States Patent
Dong et al.

(10) Patent No.: US 7,900,264 B2
(45) Date of Patent: Mar. 1, 2011

(54) MULTIMEDIA CLIENT/SERVER SYSTEM WITH COPY PROTECTION RECOVERY AND METHODS FOR USE THEREWITH

(75) Inventors: Sui Wu Dong, Markham (CA); James Ward Girardeau, Jr., Austin, TX (US)

(73) Assignee: ViXS Systems, Inc., Toronto, Ontario (CA)

( * ) Notice: Subject to any disclaimer, the term of this patent is extended or adjusted under 35 U.S.C. 154(b) by 1188 days.

(21) Appl. No.: 11/540,313

(22) Filed: Sep. 29, 2006

(65) Prior Publication Data

US 2008/0083035 A1    Apr. 3, 2008

(51) Int. Cl.
*G06F 21/24* (2006.01)
*G06F 21/22* (2006.01)
*G06F 17/30* (2006.01)
*G06F 7/04* (2006.01)

(52) U.S. Cl. .................. 726/27; 726/30; 726/31; 726/33; 726/2; 726/26; 380/201; 380/202; 380/203; 380/204; 380/208; 705/57; 705/51

(58) Field of Classification Search .................. None
See application file for complete search history.

(56) References Cited

U.S. PATENT DOCUMENTS

| | | | |
|---|---|---|---|
| 7,200,389 B2 * | 4/2007 | Date et al. ................. 455/419 |
| 7,542,758 B2 * | 6/2009 | Rajaram et al. ............ 455/419 |
| 7,548,875 B2 * | 6/2009 | Mikkelsen et al. ........... 705/26 |
| 7,577,126 B2 * | 8/2009 | Kirbas et al. ............... 370/338 |
| 7,583,955 B2 * | 9/2009 | Shin ....................... 455/414.1 |
| 7,698,297 B2 * | 4/2010 | Jawa et al. ................ 709/203 |
| 7,774,362 B2 * | 8/2010 | Dong ....................... 707/781 |
| 2004/0214551 A1 * | 10/2004 | Kim ........................ 455/412.1 |
| 2006/0222322 A1 * | 10/2006 | Levitan ....................... 386/68 |

* cited by examiner

*Primary Examiner* — Syed A. Zia
(74) *Attorney, Agent, or Firm* — Garlick Harrison & Markison; Bruce E. Stuckman

(57) ABSTRACT

A multimedia client/server system includes a multimedia server module that is coupleable to a plurality of multimedia sources that produce at least one multimedia signal. The multimedia server module includes an encoder module that asserts a protection present signal when the at least one multimedia signal includes a copy protection signal, that generates an output signal with the copy protection signal removed when the protection present signal is asserted, and that encodes the output signal to produce an encoded signal. A server transceiver module produces a radio frequency (RF) signal that includes the encoded signal and the protection present signal, and that wirelessly transmits the RF signal. A client module includes a client transceiver module that receives and demodulates the RF signal to produce a received encoded signal and a received protection present signal, and a decoder that decodes the received encoded signal into a decoded output signal that includes the copy protection signal when the received protection present signal is asserted.

49 Claims, 7 Drawing Sheets

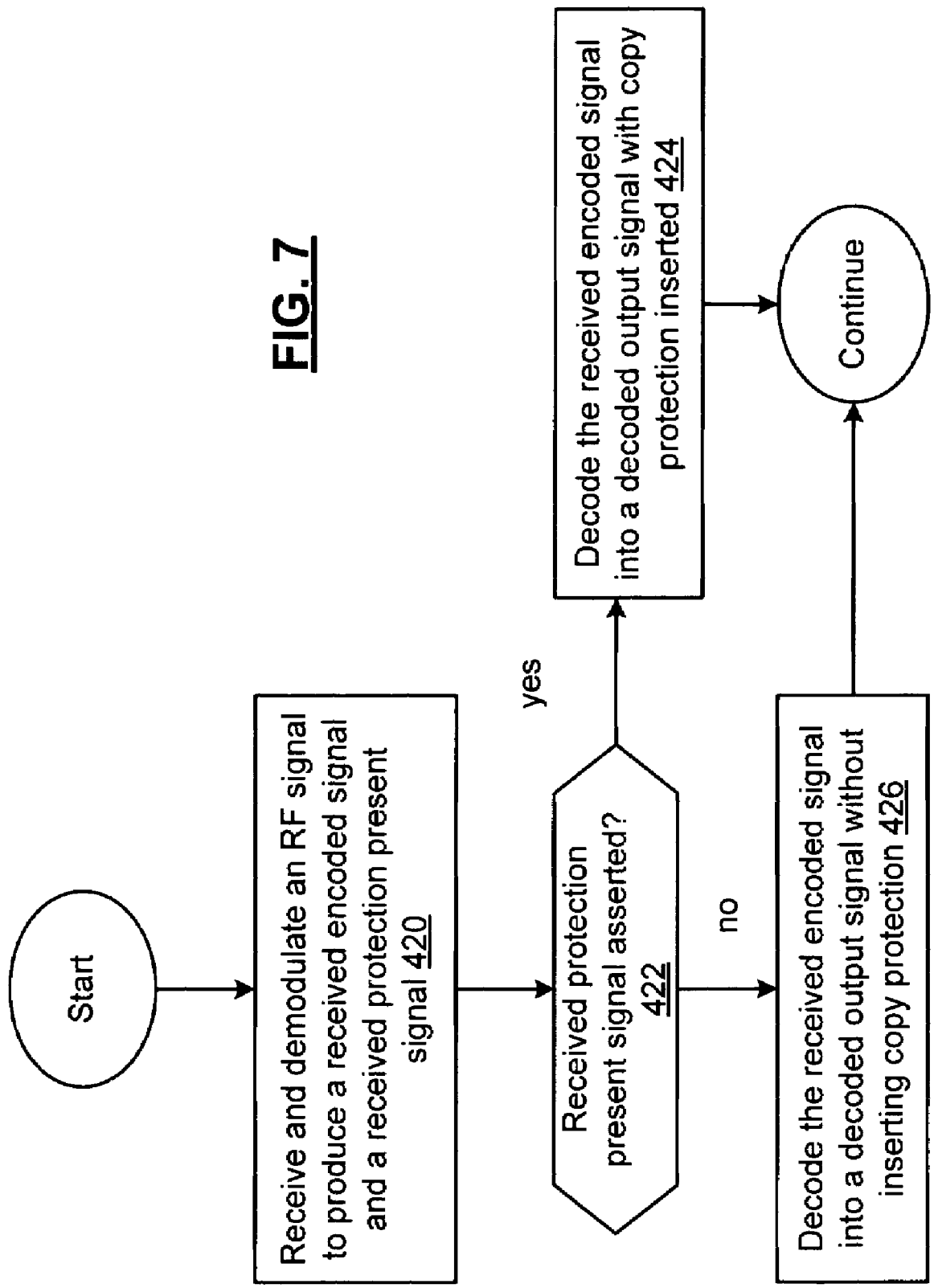

MULTIMEDIA CLIENT/SERVER SYSTEM WITH COPY PROTECTION RECOVERY AND METHODS FOR USE THEREWITH

TECHNICAL FIELD OF THE INVENTION

This invention relates generally to wireless communication systems and more particularly to in-home local area networking for content such as multimedia.

BACKGROUND OF THE INVENTION

With the number of households having multiple television sets increasing, and many users wanting the latest and greatest video viewing services. As such, many households have multiple satellite receivers, cable set-top boxes, modems, et cetera. For in-home Internet access, each computer or Internet device has its own Internet connection. As such, each computer or Internet device includes a modem.

As an alternative, an in-home wireless local area network may be used to provide Internet access and to communicate multimedia information to multiple devices within the home. In such an in-home local area network, each computer or Internet device includes a network card to access a server. The server provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

Certain multimedia content, such as music compact disks (CDs), video cassettes and digital video disks (DVDs) are recorded with copy protection signals that are meant to prevent the multimedia content contained on these media from being copied. These copy protection mechanisms can provide challenges to the compression and encoding techniques used when this content is transmitted or stored. In many such circumstances, the copy protection must be disabled.

BRIEF DESCRIPTION OF THE DRAWINGS

FIG. 7 presents a flow chart representation of a method in accordance with an embodiment of the present invention.

DETAILED DISCUSSION OF A PREFERRED EMBODIMENT

Figure 1:
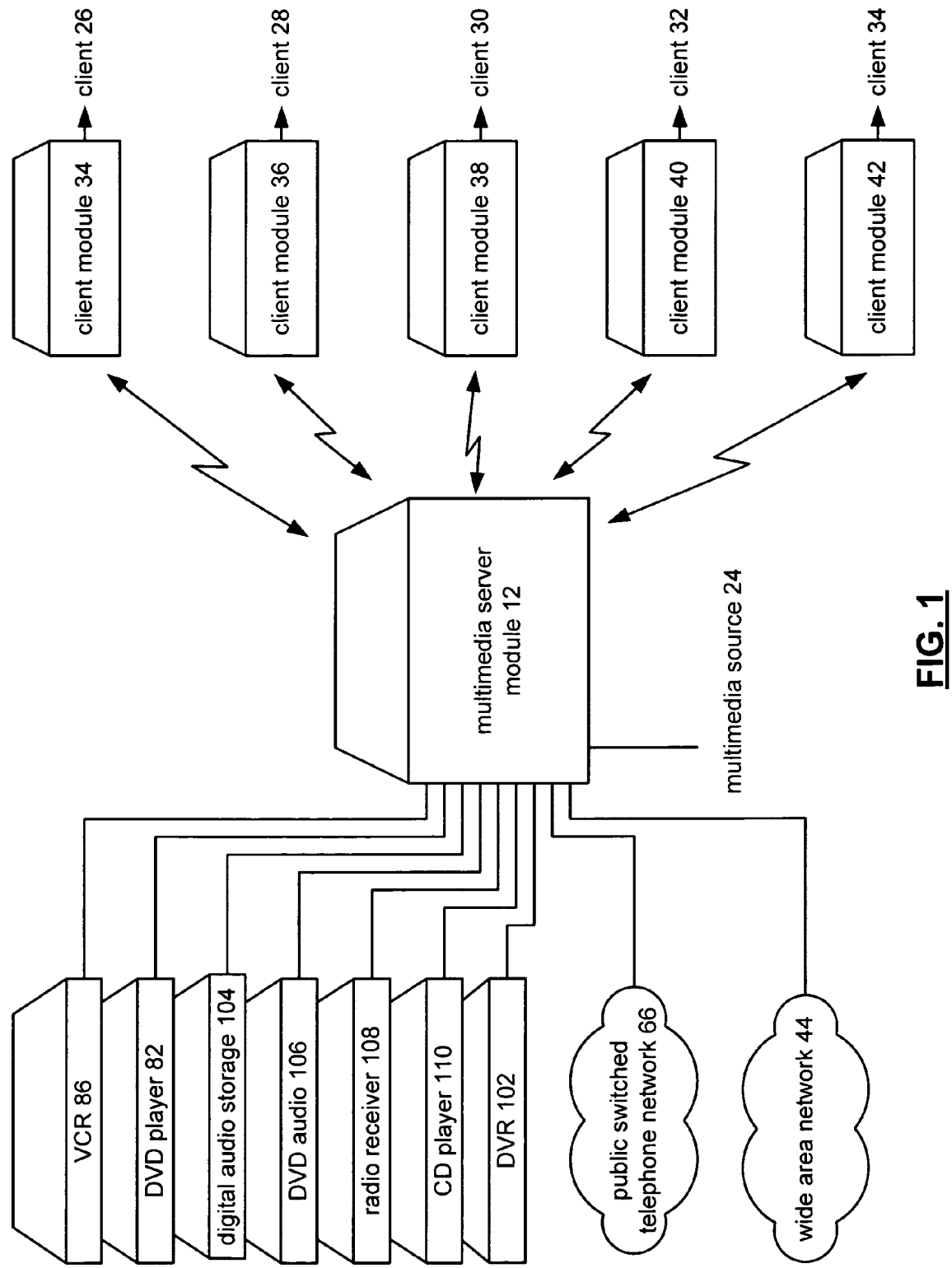
FIG. 1 presents a pictorial representation of a multimedia client server system in accordance with an embodiment of the present invention.

FIG. 1 presents a pictorial representation of a multimedia client server system in accordance with an embodiment of the present invention. The multimedia client server system includes multimedia server 12, client modules 34, 36, 38, 40 and 42 that are coupled to clients 26, 28, 30, 32, and 34, and a plurality of multimedia sources. The multimedia sources include video cassette recorder (VCR) 86, digital video disk (DVD) player 82, digital video recorder (DVR) 102, digital audio storage device 104, DVD audio 106, radio receiver 108, CD player 110, public switch telephone network 66, wide area network 44 (such as a private network, public network, satellite network, cable network and/or the Internet) for accessing broadcast, stored or streaming audio, video and/or other multimedia content and/or any other type of audio, video and/or multimedia source 24.

In an embodiment of the present invention, the clients 26-34 may select playback from, and/or connection to, any one of the multimedia sources. The selection request from each client module would identify the desired multimedia source, the client, the desired service and any other information to assist the multimedia server 12 in processing the request. As such, one client may be accessing the Internet, while another client is watching a satellite broadcast channel, while another is listening to a CD playback, while another is talking on the telephone, and yet another is watching a DVD playback. This is all done via the multimedia server 12 without requiring the clients to have direct access to the multimedia sources and without the requirement that each client have its own multimedia source and/or multimedia source connection.

The multimedia server 12 and one or more of the client modules 34, 36, 38, 40 and 42 include one or more features for increasing the reliability and quality of wireless transmission in accordance with the present invention, as will be described in greater detail in the Figures that follow, and in particular, with reference to FIGS. 2-7.

Figure 2:
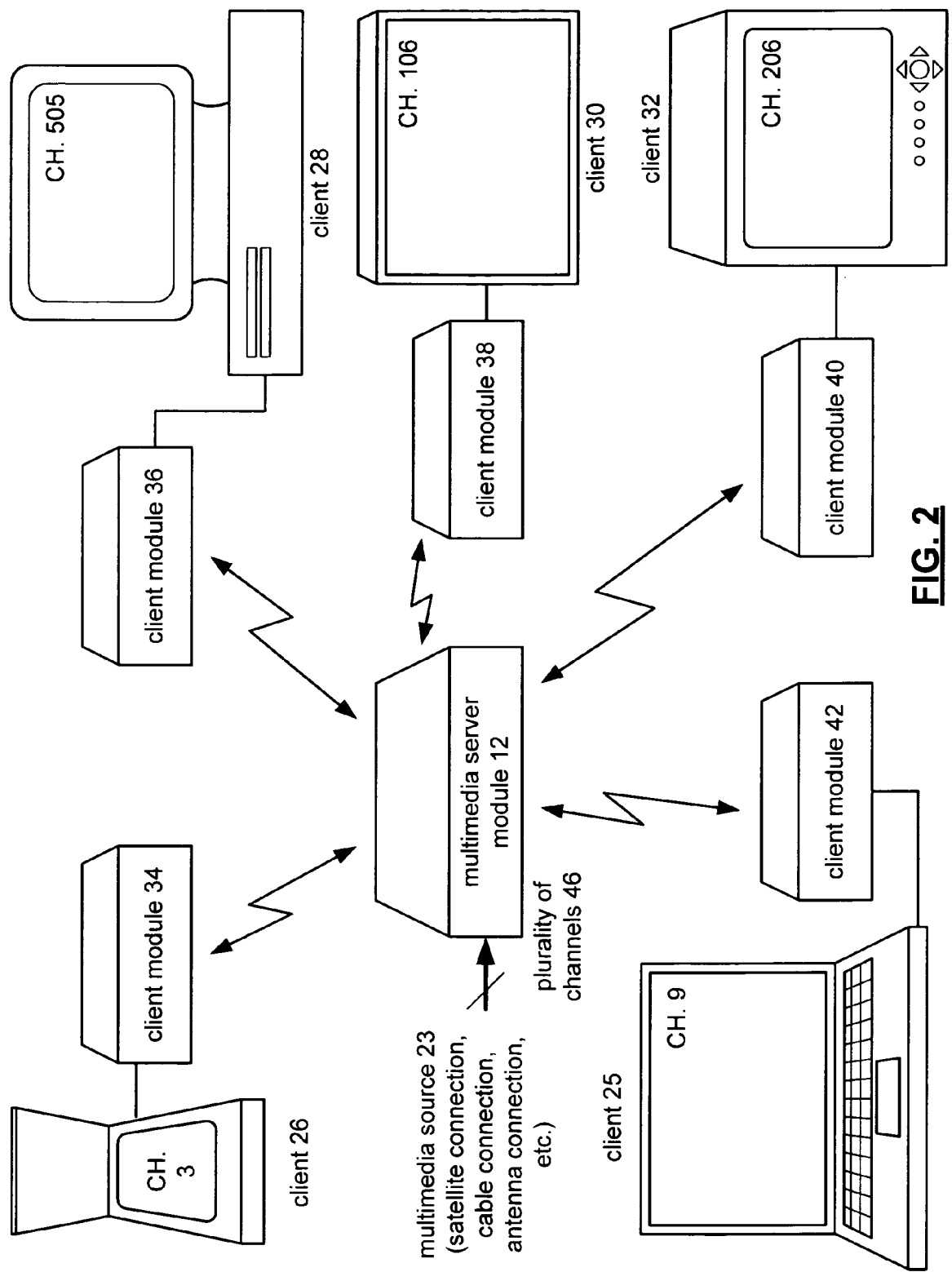
FIG. 2 presents a pictorial representation of a multimedia client/server system in accordance with an embodiment of the present invention.

FIG. 2 presents a pictorial representation of a multimedia client/server system in accordance with an embodiment of the present invention. In particular, a multimedia client/server system includes a multimedia server 12, a plurality of client modules 34, 36, 38, 40 and 42 that are operably coupled to a plurality of clients 25, 26, 28, 30, and 32. The multimedia server 12 is operably coupled to receive a plurality of channels 46 from a multimedia source 23. The multimedia source 23 can be a broadcast, stored or steaming multimedia signal, from a video cassette recorder (VCR) 86, digital video disk (DVD) player 82, digital video recorder (DVR) 102 digital audio storage device 104, DVD audio 106, radio receiver 108, CD player 110, public switch telephone network 66, wide area network 44 (such as a private network, public network, satellite network, cable network and/or the Internet for accessing broadcast, stored or streaming audio, video and/or other multimedia content) and/or any other type of audio, video and/or multimedia source 24. As one of average skill in the art will appreciate, the multimedia server 12 may be a stand-alone device, may be incorporated in a satellite receiver, set-top box, cable box, HDTV tuner, home entertainment receiver, et cetera. In addition, the multimedia server 12 may be implemented using discrete components, integrated circuits, and/or a combination thereof.

The multimedia server 12 communicates with the plurality of client modules 34, 36, 38, 40, and 42 via a radio frequency communication path. As such, the multimedia server 12 and each of the client modules 34, 36, 38, 40 and 42 each include a transceiver that operates to send and receive data via the communication path.

As shown, each client module is operably coupled to one of the clients. For example, client module 34 is operably coupled to client 26, which is representative of a personal digital assistant. Client module 36 is operably coupled to client 28, which is representative of a personal computer. Client module 38 is operably coupled to client 30, which is representative of a monitor (e.g., LCD monitor, flat panel monitor, CRT monitor, et cetera). Such a monitor may include speakers, or a speaker connection, control functions including channel select, volume control, picture quality, et cetera. Client module 40 is operably coupled to client 32, which may be a television set, high definition television (HDTV), standard definition television (SDTV), a home theatre system, et cetera. Client module 42 is operably coupled to client 25, which is representative of a laptop computer.

As one of average skill in the art will appreciate, each client module may be a separate device from its associated client or embedded within the client. In addition, one of average skill in the art will further appreciate that the client modules 34, 36, 38, 40 and 42 may be implemented utilizing discrete components and/or integrated circuits.

In an embodiment of the present invention, each of the clients, via its associated client module, selects one or more channels from the plurality of channels 46. As shown, client 26 has selected channel 3 of the plurality of channels for viewing. Accordingly, client module 34 relays the channel selection of channel 3 to the multimedia server 12. The multimedia server 12 selects channel 3 from the plurality of channels 46. The data corresponding to channel 3 is then time multiplexed with the data for the other channels and transmitted from the multimedia server 12 to each of the client modules 34, 36, 38, 40 and 42. Client module 34 monitors the transmission from the multimedia server 12 and extracts the data corresponding to channel 3. The extracted data for channel 3 is then provided to the client 26 for display.

Client module 36, 38, 40 and 42 perform a similar function for their associated clients 28, 30, 32 and 25, respectively. As shown, client 28 has selected channel 505, client 30 has selected channel 106, client 32 has selected channel 206 and client 25 has selected channel 9. The client modules 36, 38, 40 and 42 provide the channel selection of its respective client to the multimedia server 12. Multimedia server 12 extracts the selected channels from the plurality of channels for each selection request, multiplexes the data for each of the selected channels (for this example channel 3, 9, 106, 206 and 505) into a stream of data. The stream of data is then transmitted to each of the client modules. Each client module extracts the appropriate data of the selected channel for its respective client. For example, client module 36 monitors the transmitted data for data related to channel 505, client module 38 monitors for data related to channel 106, client module 40 monitors the transmission for data related to channel 206 and client module 42 monitors the transmission for data related to channel 9.

From each client's prospective, the client 25, 26, 28, 30 and 32 has independent access to the multimedia source 23. Accordingly, client 26 may at any time change its channel selection from, for example, channel 3 to channel 120. The client module 34 provides the channel selection request which may be the absence of acknowledgements to the multimedia server 12, which now retrieves data related to channel 120 for client 36 as opposed to channel 3. As an alternate embodiment, the functionality of client modules 34, 36, 38, 40 and 42 may vary. For example, client module 34 may not provide all the independent functionality that client module 36 does. For example, client module 34 may not have independent channel selection capabilities but only selecting channels that one of the other clients have selected. Alternatively, one client module may service a plurality of clients.

Figure 3:
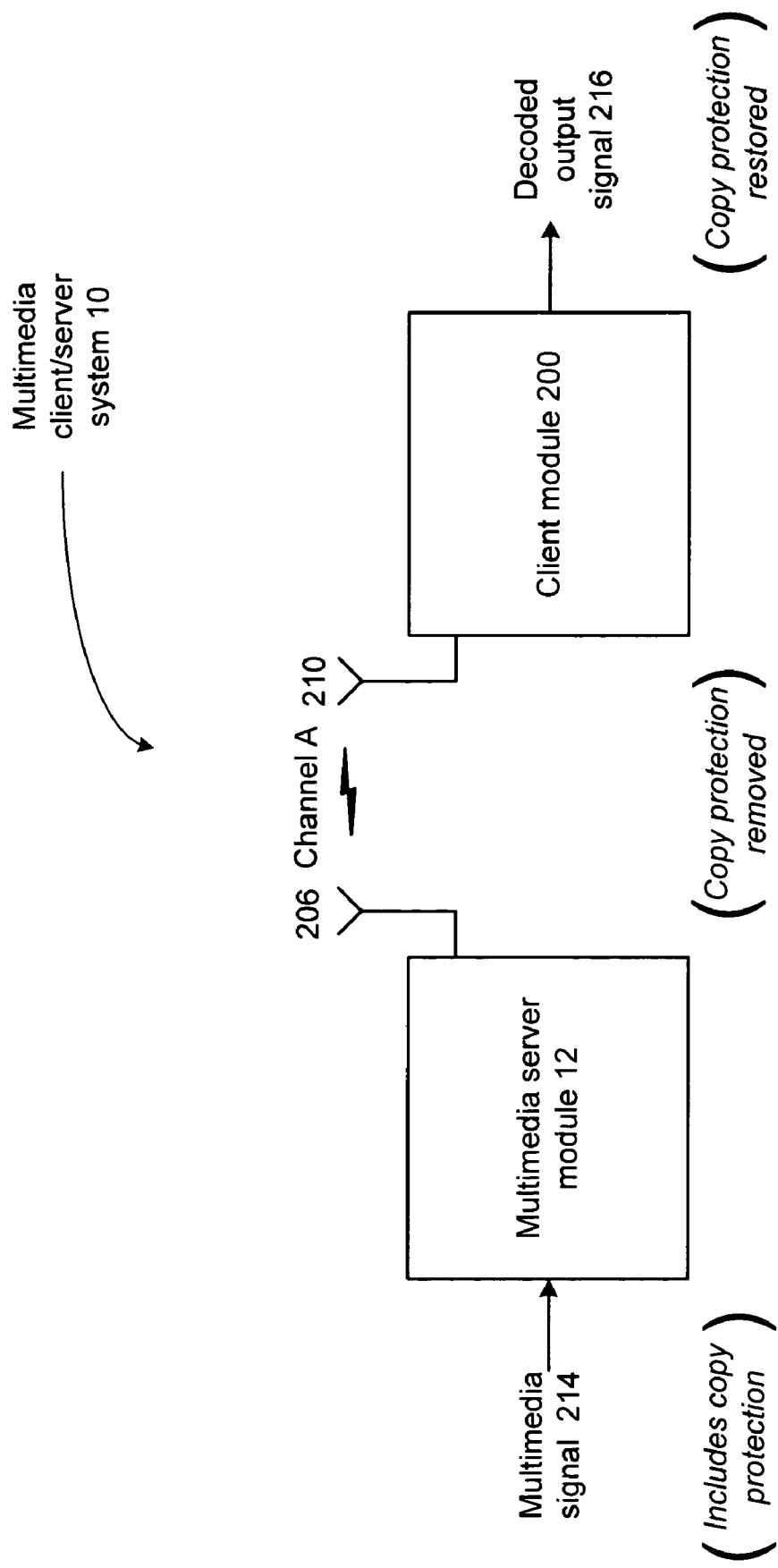
FIG. 3 presents a block diagram representation of a multimedia client/server system in accordance with an embodiment of the present invention.

FIG. 3 presents a block diagram representation of a multimedia client/server system 10 in accordance with an embodiment of the present invention. In particular, the multimedia client/server system 10 includes multimedia server 12 that transmits a multimedia signal 214, such as a broadcast, stored or streaming signal from multimedia source 23. Multimedia server module 12 transmits, via antenna 206, a radio frequency (RF) signal that contain the multimedia content from multimedia signal 214. This RF signal is transmitted at a carrier frequency corresponding to a channel such as channel A of an RF spectrum. Client module 200, (such as client modules 34, 36, 38, 40 and 42) receives the RF signal via antennas 210 and produces a decoded output signal 216.

It should be noted that channel A represents a channel of an RF spectrum corresponding to one or more carrier frequencies. This is as opposed to channels 3, 9, 106, 206 and 505 discussed in association with FIG. 2 where "channel", is this context, was used primarily to denote difference streams of multimedia content such as "The Weather Channel", "The Discovery Channel" or "Gone with the Wind". In the event that noise, interference or fading hamper the performance of one of the channels, the multimedia server module 12 can switch to a different channel.

In accordance with the present invention, multimedia server module 12 is capable of detecting a copy protection signal implanted in multimedia signal 214. In response, a protection present signal is asserted and an output signal is generated by removing the copy protection signal. The output signal is then encoded to produce an encoded signal. A radio frequency (RF) signal is generated that includes the encoded signal and the protection present signal and is wirelessly transmitted to client module 200 over channel A. When the RF signal is received by the client module 200, it is demodulated to produce a received encoded signal and a received protection present signal. The client module 200 further decodes the received encoded signal into a decoded output signal while inserting the copy protection signal, when the received protection present signal is asserted. While the copy protection is removed for encoding, compression and transmission, the copy protection is restored at the client module 200. In this fashion, if a user chooses to connect a recording device, such as video cassette recorder or digital video disk recorder to client module 200, the copy protection is present in the decoded output signal 216. In an embodiment of the present invention, the transmitted multimedia content can further be encrypted in the encoding process and decrypted in the decoding process, such as by RSA encryption, WEP, or protected using other secure access protocols such as MAC address filtering, so that if the content is wirelessly received by an authorized client device, the unprotected multimedia content can be otherwise protected.

In an embodiment of the present invention, the copy protection signal is a signal in accordance with a Macrovision or CGMS-A (Copy Generation Management System Analogue) copy protection methodology. One example of such copy protection methodology is Macrovision or CGMS-A for video that implants a signal in the off-screen portion of the video signal that is either recorded on a tape, such in a video signal played back via a video cassette recorder, or created during playback by a circuit, such as an integrated circuit that is part of a the video player, such as a DVD player or set-top box. In particular, Macrovision or CGMS-A for video inserts pulses in the vertical blanking interval of the video signal that disturbs the normal operation of the automatic gain control used by video recording devices, such as video cassette recorders used to copy a video. Other examples of such copy protection methods include Macrovision or CGMS-A, Rip- Guard, SafeCast, Cactus Data Shield and other copy protection methods and signals employed by Macrovision or CGMS-A and/or others.

Further functions and features of the multimedia server module 12 and client module 200 are presented in conjunction with FIGS. 4-7 that follow.

Figure 4:
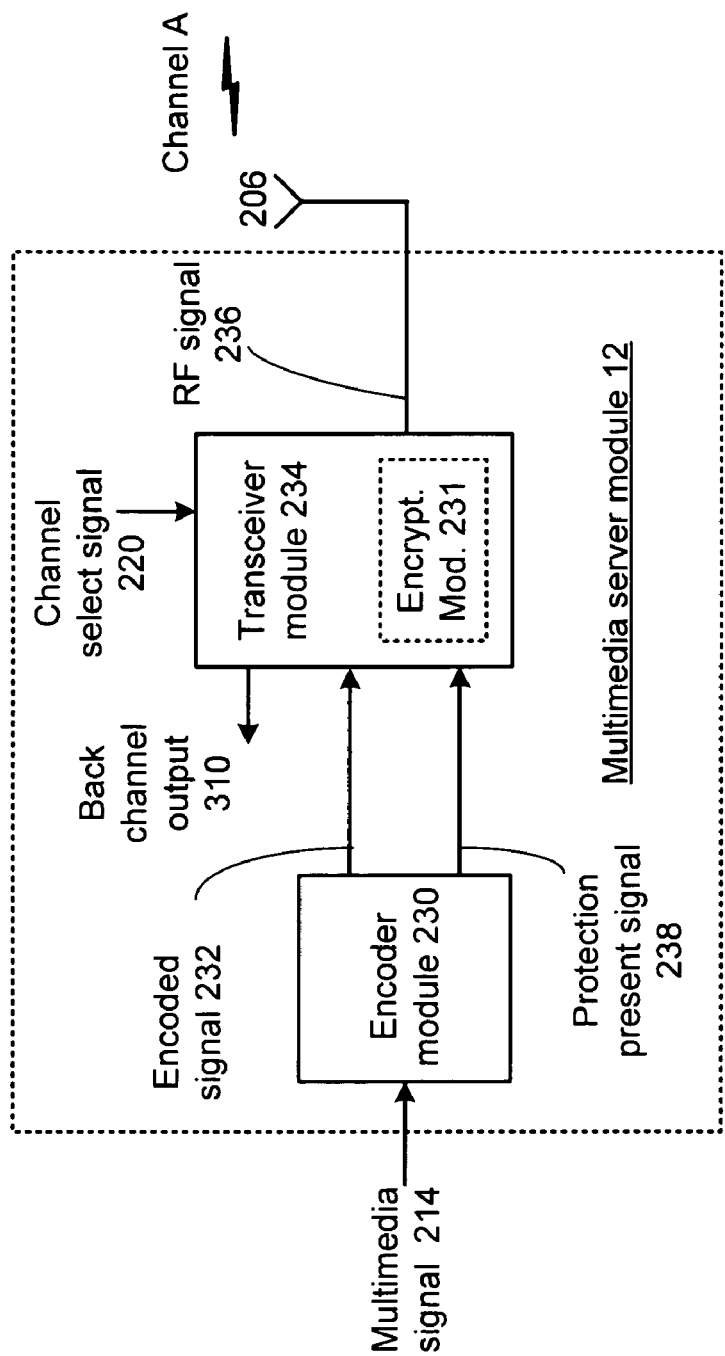
FIG. 4 presents a block diagram representation of a multimedia server module 12 in accordance with an embodiment of the present invention.

FIG. 4 presents a block diagram representation of a multimedia server module in accordance with an embodiment of the present invention. In particular, multimedia server module 12 includes an encoder module 230 for producing an encoded signal 232 from unencoded multimedia input signal 214. In an embodiment of the present invention, the encoding scheme may be one or more of multilevel, multiphase and multifrequency encoding, non-return to zero encoding, Manchester encoding, block encoding and/or nB/mB encoding wherein n>m. For example, the nB/mB may be 4B/5B encoding where 4 bits of actual data are converted into 5 bits of encoded data.

Encoding may further include compression, transrate and transcode encoding of the multimedia signal based on the content and format of multimedia signal 214 and the bandwidth and performance of channel A. In an embodiment, the multimedia signal 214 includes an analog composite video signal that is formatted in any of a number of video formats including National Television Systems Committee (NTSC), Phase Alternating Line (PAL) or Sequentiel Couleur Avec Memoire (SECAM). The encoded signal 232 may be digitized, compressed, and channel coded for transmission at low data rates in weak channel conditions or higher data rates in stronger channel conditions. Alternatively, multimedia signal 214 can be already in a digital format such as a Motion Picture Experts Group (MPEG) format (such as MPEG1, MPEG2, MPEG4), a Society of Motion Picture and Television Engineers (SMPTE) standard such as VC1, H.264, Quicktime format, Real Media format, Windows Media Video (WMV) or Audio Video Interleave (AVI), or another digital video format, either standard or proprietary. In this case, the encoding performed by encoder module 230 may be limited to encoding of the data for the channel, based on the strength or quality of the channel conditions, with or without further compression.

In an embodiment of the present invention, encoder module 230 asserts a protection present signal 238, (such as one or more flag bits, or other signal that uniquely identified the presence or absence of a copy protection signal and optionally the type of copy protection signal that was detected) when the multimedia signal 214 includes a copy protection signal. In addition, encoder module 230 generates an output signal with the copy protection signal removed when the protection present signal 238 is asserted, and encodes the output signal to produce an encoded signal 232. Transceiver module 234, in turn, produces RF signal 236 that includes the encoded signal 232 and the protection present signal 238, and wirelessly transmits the RF signal 236 to a client device, such as through client module 200.

In an embodiment of the present invention, multimedia signal 214 includes a video signal and the copy protection signal is Macrovision or CGMS-A signal that is implanted in a vertical blanking interval of the video signal. While this signal is removed by multimedia server module 12, a protection present signal is asserted and transmitted along with the encoded signal so that the Macrovision or CGMS-A signal can be restored in the video signal during decoding by the client module, such as client module 200.

Further, encoder 230 can optionally operate in either a frame mode or a field mode. Depending on the mode, encoder module 230 can detect the copy protection on a frame/field basis and indicate for each frame/field that the copy protection is either present or absent. In this fashion, the client module, such as client module 200 can insert the copy protection signal for each frame/field of the decoded video signal. In particular, the encoder module 230, when in a frame mode, asserts the protection present signal 238 when a frame of the video signal includes a copy protection signal, removes the copy protection signal from the frame of the output signal and encodes the frame of the output signal to produce a frame of the encoded signal 232. In addition, encoder module 230, when in a field mode, asserts the protection present signal 238 when a field of the video signal includes a copy protection signal, removes the copy protection signal from the field of the output signal, and encodes the field of the output signal to produce a field of the encoded signal 232.

In an embodiment of the present invention, encoder module 230 can operate as a transcoder to receive a multimedia input signal 214 in a first digital format, decode this signal and re-encode it into a second digital format for transmission. For example, multimedia input 214 can include a compressed MPEG2/4 input that is copy protected via Conditional Access (CA). The encoder module 230 operates to detect and disable the copy protection, asserts the protection present signal and indicates that the type of copy protection is CA, decompresses the signal and re-encodes it in another format, such as H.264.

In addition, encoder module 230 can receive a multimedia input signal that is in a digital format such as High-Definition Multimedia Interface (HDMI) and detect that this signal is protected, such as by High-Bandwidth Digital Content Protection (HDCP). The HDCP can be disabled prior to encoding and the encoder module 230 can produce a protection present signal that is asserted and that indicates that HDCP was present on the input.

In an embodiment of the present invention, encoder module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital), optionally based on operational instructions that are stored in a memory that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the encoder module implements one or more of its functions via a state machine, analog circuitry, digital circuitry, and/or logic circuitry based on operational instructions, the memory storing the corresponding operational instructions may be embedded within, or external to, the circuitry comprising the state machine, analog circuitry, digital circuitry, and/or logic circuitry.

Multimedia server module 12 further includes transceiver module 234 for modulating the encoded signal 232 to produce a RF signal 236 that includes multimedia content such as a packetized video signal at a first carrier frequency and for transmitting the RF signal 236 over channel A using antenna 206. In addition, transceiver modules 234 produces back channel output 310 based on an RF signal received from the client module 200 over channel A.

In an embodiment of the present invention, transceiver module 234 is selectively tunable to a plurality of other carrier frequencies in response to channel selection signal 220. For instance, in an implementation of the multimedia server module 12 and client module 200 using wireless transmission link in the United States that conforms with the IEEE 802.11g standard, channel A can be selected as any of the 11 allocated channels. In an embodiment of the present invention, the channel selection signals can be preprogrammed into multimedia server module 12, dynamically chosen based on a site survey that scans the available channels to determine a suitable channel for use, received from the client module 200 or arbitrated between the client module 200 and multimedia server module 12, or selected under user control. Similarly, channel A can be implemented as a channel of a broadband wireless access network that conforms to at least one of the following standards: 802.11a, b, n or other 802.11 standard, Ultra Wideband (UWB), or Worldwide Interoperability for Microwave Access (WiMAX). Transceiver module 234 includes encryption module 231 for optionally encrypting the encoded signal 232 and optionally the protection present signal 238 As discussed in conjunction with FIG. 3. While shown as part of transceiver module 234, encryption module 231 can optionally be implemented as a stand alone module.

Figure 5:
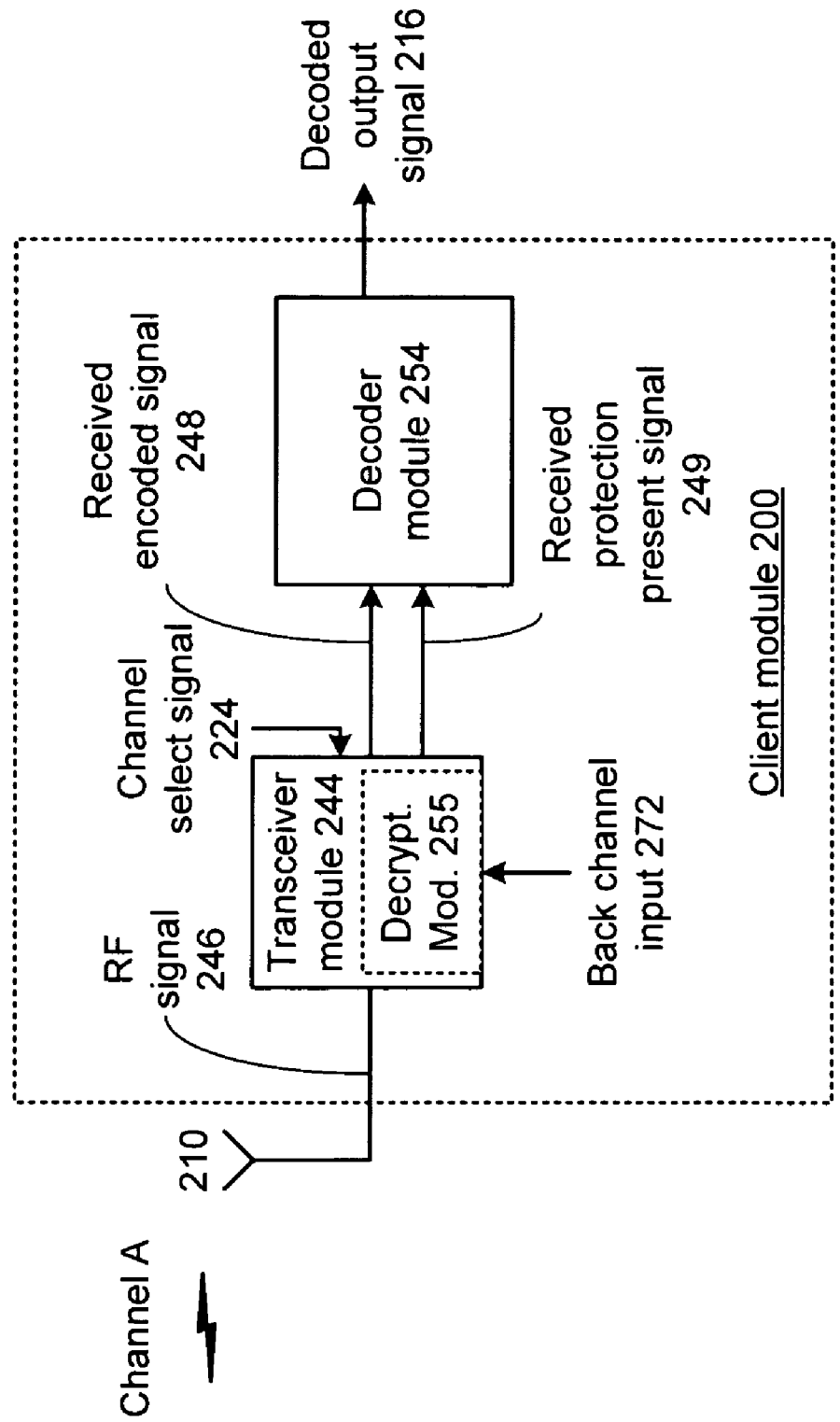
FIG. 5 presents a block diagram representation of a client module 200 in accordance with an embodiment of the present invention.

FIG. 5 presents a block diagram representation of a client module 200 in accordance with an embodiment of the present invention. In particular, client module 200 includes transceiver module 244 for receiving RF signal 246 over channel A or an alternate channel selected by multimedia server module 12 and for converting the RF signal 246 into a received encoded signal 248 and received protection present signal 249. In addition, transceiver module 244 is operable to modulate back channel input 272 to produce RF signals sent to multimedia server module 12 over channel A. Transceiver module 244 includes decryption module 255 for optionally decrypting the received encoded signal 246 and the received protection present signal 249 As discussed in conjunction with FIG. 3. While shown as part of transceiver module 244, decryption module 255 can optionally be implemented as a stand alone module.

In an embodiment of the present invention, multimedia server module 12 and client module 200 use a wireless transmission link that conforms with the IEEE 802.11g standard that uses a 52-subcarrier orthogonal frequency division multiplexing (OFDM) with a maximum data rate of 54 Mbits/sec. The data rate is reduced in increments in response to adverse channel conditions from 48 mbits/sec, down to as low as 6 Mbits/sec by modifying the modulation and effective coding rate from 64-quadrature amplitude modulation (64-QAM) to binary phase shift keying (BPSK). The 52 subcarriers of a channel are spaced 312.5 kHz apart, where 48 of the subcarriers carry data, and 4 subcarriers carry pilot tones. Received encoded signal 248 can be a baseband signal or a low intermediate frequency (IF) signal.

In an embodiment of the present invention, received encoded signal 248 can optionally be sent to decoder module 254 through a physical electronic connection such as Universal Serial Bus (USB), Personal Computer Interface (PCI), Firewire, or small computer service interface (SCSI), ASI (Asynchronous Serial Interface), SPI (Serial Peripheral Interface). However, other physical electronic connections, either standard or proprietary may likewise be implemented or used within the broad scope of the present invention.

Client module 200 further includes decoder module 254 for decoding the received encoded signal 248 into a decoded output signal 216, such as in a format used by the attached client. In particular, further decoding of the data can include decompression of a compressed digital signal, formatting of a video signal as in NTSC, PAL, SECAM, etc., and other formatting to match the input format of the client device. As discussed above, transceiver module 244 receives and demodulates RF signal 246 to produce a received encoded signal 248 and received protection present signal 249. Decoder module 254 decodes the received encoded signal 248 into a decoded output signal 216 while inserting (such as by restoring) the copy protection signal when the received protection present signal 249 is asserted.

In an embodiment of the present invention, the received encoded signal 248 includes a video signal and the copy protection signal, such as a Macrovision HDCP or CGMS-A protection signal, is implanted in a vertical blanking interval of the video signal during decoding. Further, decoder module 254, when in a frame mode, inserts the copy protection signal into a frame of the decoded output signal 216 when the received protection present signal 249 is asserted. In addition, decoder module 254, when in a field mode, inserts the copy protection signal into a field of the decoded output signal 216 when the received protection present signal 249 is asserted.

In an embodiment of the present invention, the decoder module determines the type of copy protection that was present on the multimedia input signal 214 from the received protection present signal 249 and, if possible, inserts the type of protection that was originally present. In some cases, however, the format of the decoded output signal is not compatible with the type of protection. For instance, the multimedia input signal 216 can be a HDMI input protected by HDCP or a MPEG2/4 input protected by CA, while the decoded output signal is formatted for NTSC. In this case, a different copy protection, such as Macrovision or CGMS-A can be inserted. Further, the decoder module 254 can optionally insert the same type of copy protection (such as Macrovision or CGMS-A for all video signals), regardless of the type or copy protection originally present or may other wise change the copy protection method as may be advantageous in other circumstances.

In an embodiment of the present invention, decoder module 254 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital), optionally based on operational instructions that are stored in a memory that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the decoder module implements one or more of its functions via a state machine, analog circuitry, digital circuitry, and/or logic circuitry based on operational instructions, the memory storing the corresponding operational instructions may be embedded within, or external to, the circuitry comprising the state machine, analog circuitry, digital circuitry, and/or logic circuitry.

In an embodiment of the present invention, transceiver module 244 is selectively tunable to a plurality of other carrier frequencies in response to channel selection signals 224. For instance, in an implementation of the multimedia server module 12 and client module 200 using wireless transmission link in the United States that conforms with the IEEE 802.11g standard, channel A can be selected as any two of the 11 allocated channels. In an embodiment of the present invention, the channel selection signals can be preprogrammed into client module 200, dynamically chosen based on a site survey that scans the available channels to determine two suitable channels for use, received from the multimedia server module 12 or arbitrated between the client module 200 and multimedia server module 12, or selected under user control.

The description above has been limited to spectrum reserved for 802.11x compliant broadband access networks, in an alternative embodiment of the present invention, other spectrum and other wireless links including Ultra Wideband (UWB), Worldwide Interoperability for Microwave Access (WiMAX) and other wireless links can likewise be implemented.

Figure 6:
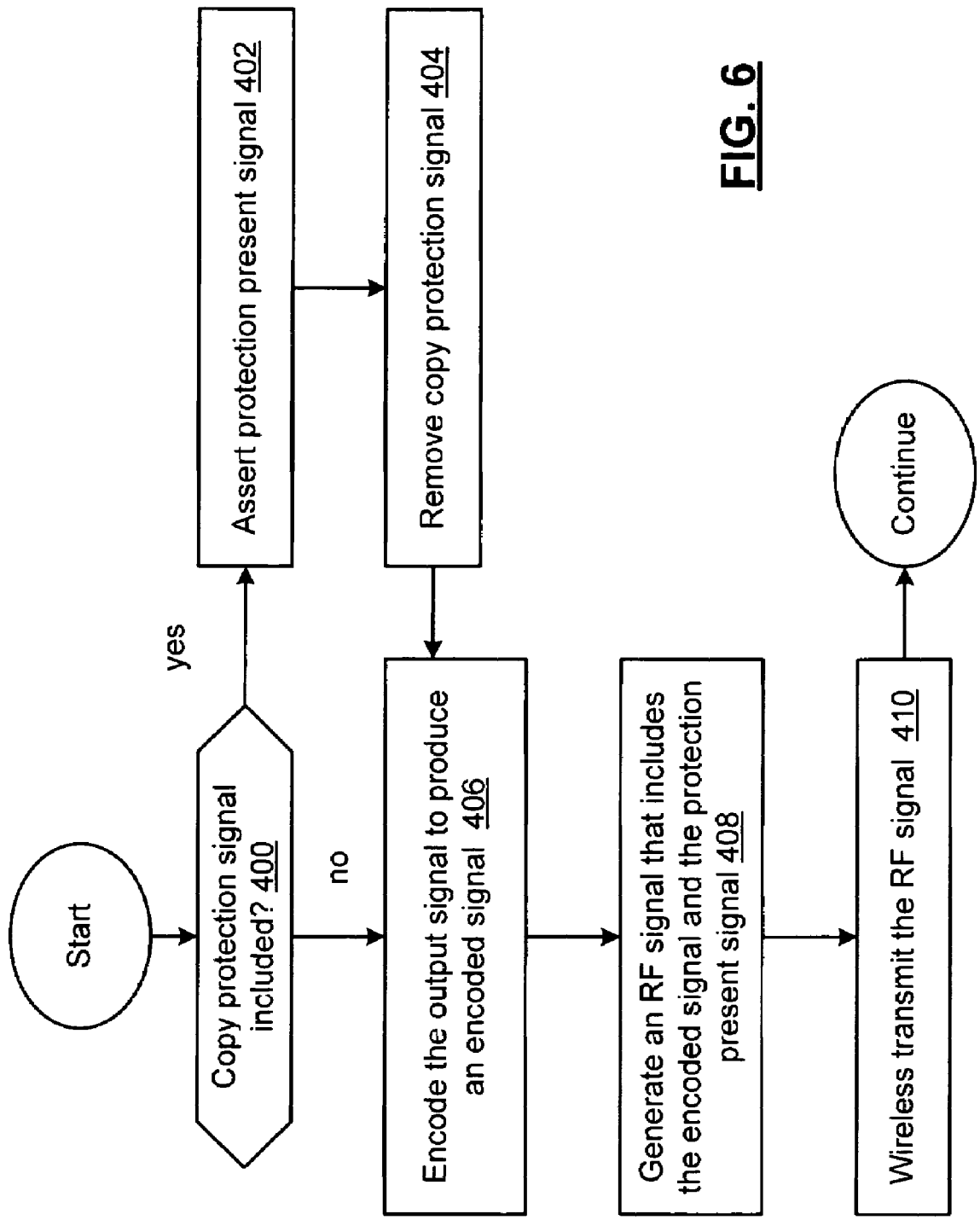
FIG. 6 presents a flow chart representation of a method in accordance with an embodiment of the present invention.

FIG. 6 presents a flow chart representation of a method in accordance with an embodiment of the present invention. In particular, a method is presented for use in conjunction with one or more of the functions and features described in association with FIGS. 1-5. In step 400, the method determines if multimedia signal includes a copy protection signal. If so, the method proceeds to assert a protection present signal in step 402 and generates an output signal with the copy protection signal removed as shown in step 404. If not the method proceeds directly to step 406 where the output signal is encoded to produce an encoded signal. In step 408, a radio frequency (RF) signal is generated that includes the encoded signal and the protection present signal. In step 410, the RF signal is wirelessly transmitted.

In an embodiment of the present invention, the multimedia signal includes a video signal and the copy protection signal is implanted in a vertical blanking interval of the video signal. In addition, the copy protection signal can include a Macrovision or CGMS-A protection signal. Further, step 402 can operate to assert the protection present signal when a frame of the video signal includes a copy protection signal, and step 404 can operate to remove the copy protection signal from the frame of the output signal, and step 406 can operate to encodes the frame of the output signal to produce a frame of the encoded signal similarly, step 402 can operate to assert the protection present signal when a field of the video signal includes a copy protection signal, and step 404 can operate to remove the copy protection signal from the field of the output signal, and step 406 can operate to encodes the field of the output signal to produce a field of the encoded signal.

In an embodiment, step 406 encodes the output signal in accordance with one of a Motion Picture Experts Group (MPEG) standard, and a Society of Motion Picture and Television Engineers (SMPTE) standard. Further, step 410 transmits the RF signal over a broadband wireless access network that conforms to at least one of the following standards: 802.11x, Ultra Wideband (UWB), and Worldwide Interoperability for Microwave Access (WiMAX).

FIG. 7 presents a flow chart representation of a method in accordance with an embodiment of the present invention. In particular, a method is presented for use in conjunction with one or more of the functions and features described in association with the method of FIG. 6. In step 420, an RF signal is received and demodulated to produce a received encoded signal and a received protection present signal. The method determines if the received protection present signal is asserted, as shown in step 422. If so, the received encoded signal is decoded into a decoded output signal while inserting the copy protection signal as shown in step 424. Otherwise, the received encoded signal is decoded into a decoded output signal without inserting the copy protection signal as shown in step 426.

In an embodiment of the present invention, the received encoded signal includes a video signal and step 424 includes implanting the copy protection signal in a vertical blanking interval of the video signal. Further, the copy protection signal can include a Macrovision or CGMS-A protection signal.

In addition, step 424, when in a frame mode, can insert the copy protection signal into a frame of the decoded output signal. Also, step 424, when in a field mode, can insert the copy protection signal into a field of the decoded output signal.

In an embodiment, steps 424 and 426 decode the output signal in accordance with one of a Motion Picture Experts Group (MPEG) standard, and a Society of Motion Picture and Television Engineers (SMPTE) standard. In addition, step 420 can receive the RF signal over a broadband wireless access network that conforms to at least one of the following standards: 802.11x, Ultra Wideband (UWB), and Worldwide Interoperability for Microwave Access (WiMAX).

In an embodiment of the present invention, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to order of magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more module functions such as the processing of an input signal to produce an output signal. As used herein, a module may contain submodules that themselves are modules. When implemented in software or firmware, each module can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Thus, there has been described herein an apparatus and method, as well as several embodiments including a preferred embodiment, for implementing a multimedia client/server system, multimedia server module, client module, encoder module and decoder module. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A multimedia client/server system comprising:
   a multimedia server module, coupleable to a plurality of multimedia sources that produce at least one multimedia signal, the multimedia server module including:
      an encoder module that asserts a protection present signal when the at least one multimedia signal includes a copy protection signal, that generates an output signal with the copy protection signal removed when the protection present signal is asserted, and that encodes the output signal to produce an encoded signal;
      a server transceiver module, coupled to the encoder module, that produces a radio frequency (RF) signal that includes the encoded signal and the protection present signal, and that wirelessly transmits the RF signal;
   a client module, coupleable to at least one client device, the client module including:
      a client transceiver module that receives and demodulates the RF signal to produce a received encoded signal and a received protection present signal;
      a decoder module, coupled to the client transceiver module, that decodes the received encoded signal into a decoded output signal that includes an inserted copy protection signal when the received protection present signal is asserted.

2. The multimedia client/server system of claim 1 wherein the at least one multimedia signal includes a video signal and the copy protection signal is implanted in a vertical blanking interval of the video signal.

3. The multimedia client/server system of claim 1 wherein the copy protection signal includes one of a Macrovision protection signal, High-Bandwidth Digital Content Protection (HDCP) protection signal and a Copy Generation Management System Analogue (CGMS-A) protection signal.

4. The multimedia client/server system of claim 1 wherein the at least one multimedia signal includes a video signal and wherein the encoder module, when in a frame mode, asserts the protection present signal when a frame of the video signal includes a copy protection signal, that removes the copy protection signal from the frame of the output signal that encodes the frame of the output signal to produce a frame of the encoded signal.

5. The multimedia client/server system of claim 1 wherein the at least one multimedia signal includes a video signal and wherein the encoder module, when in a field mode, asserts the protection present signal when a field of the video signal includes a copy protection signal, that removes the copy protection signal from the field of the output signal that encodes the field of the output signal to produce a field of the encoded signal.

6. The multimedia client/server system of claim 1 wherein the at least one multimedia signal includes a video signal and wherein the decoder module, when in a frame mode, inserts the inserted copy protection signal into a frame of the decoded output signal when the received protection present signal is asserted.

7. The multimedia client/server system of claim 1 wherein the at least one multimedia signal includes a video signal and wherein the decoder module, when in a field mode, inserts the inserted copy protection signal into a field of the decoded output signal when the received protection present signal is asserted.

8. The multimedia client/server system of claim 1 wherein the encoder module encodes the output signal in accordance with one of a Motion Picture Experts Group (MPEG) standard, and a Society of Motion Picture and Television Engineers (SMPTE) standard.

9. The multimedia client/server system of claim 1 wherein the server transceiver module and the client transceiver module communicate over a broadband wireless access network that conforms to at least one of the following standards: 802.11x, Ultra Wideband (UWB), and Worldwide Interoperability for Microwave Access (WiMAX).

10. The multimedia client/server system of claim 1 wherein the encoder module determines a copy protection type and the protection present signal indicates the copy protection type.

11. The multimedia client/server system of claim 10 wherein the inserted copy protection signal has a type indicated by the copy protection type.

12. The multimedia client/server system of claim 1 wherein the inserted copy protection signal has a type, based on a format of the decoded output signal.

13. The multimedia client/server system of claim 1 wherein the encoder module transcodes the at least one multimedia input signal.

14. A multimedia server, coupleable to a plurality of multimedia sources that produce at least one multimedia signal, the multimedia server comprising:
   an encoder module that asserts a protection present signal when the at least one multimedia signal includes a copy protection signal, that generates an output signal with the copy protection signal removed when the protection present signal is asserted, and that encodes the output signal to produce an encoded signal; and
   a server transceiver module, coupled to the encoder module, that produces a radio frequency (RF) signal that includes the encoded signal and the protection present signal, and that wirelessly transmits the RF signal to a client device.

15. The multimedia server of claim 14 wherein the at least one multimedia signal includes a video signal and the copy protection signal is implanted in a vertical blanking interval of the video signal.

16. The multimedia server of claim 14 wherein the copy protection signal includes one of a Macrovision protection signal, High-Bandwidth Digital Content Protection (HDCP) protection signal and a Copy Generation Management System Analogue (CGMS-A) protection signal.

17. The multimedia server of claim 14 wherein the at least one multimedia signal includes a video signal and wherein the encoder module, when in a frame mode, asserts the protection present signal when a frame of the video signal includes a copy protection signal, that removes the copy protection signal from the frame of the output signal that encodes the frame of the output signal to produce a frame of the encoded signal.

18. The multimedia server of claim 14 wherein the at least one multimedia signal includes a video signal and wherein the encoder module, when in a field mode, asserts the protection present signal when a field of the video signal includes a copy protection signal, that removes the copy protection signal from the field of the output signal that encodes the field of the output signal to produce a field of the encoded signal.

19. The multimedia server of claim 14 wherein the encoder module encodes the output signal in accordance with one of a Motion Picture Experts Group (MPEG) standard, and a Society of Motion Picture and Television Engineers (SMPTE) standard.

20. The multimedia server of claim 14 wherein the server transceiver module transmits the RF signal over a broadband wireless access network that conforms to at least one of the following standards: 802.11x, Ultra Wideband (UWB), and Worldwide Interoperability for Microwave Access (WiMAX).

21. The multimedia server of claim 14 wherein the encoder module determines a copy protection type and the protection present signal indicates the copy protection type.

22. The multimedia server of claim 14 wherein the encoder module transcodes the at least one multimedia input signal.

23. A multimedia client device, coupleable to at least one client device, the multimedia device comprising:
a client transceiver that receives and demodulates an RF signal to produce a received encoded signal and a received protection present signal;
a decoder, coupled to the client transceiver, that decodes the received encoded signal into a decoded output signal while inserting an inserted copy protection signal when the received protection present signal is asserted.

24. The multimedia client device of claim 23 wherein the received encoded signal includes a video signal and the copy protection signal is implanted in a vertical blanking interval of the video signal.

25. The multimedia client device of claim 23 wherein the copy protection signal includes one of a Macrovision protection signal, High-Bandwidth Digital Content Protection (HDCP) protection signal and a Copy Generation Management System Analogue (CGMS-A) protection signal.

26. The multimedia client device of claim 23 wherein the at least one multimedia signal includes a video signal and wherein the decoder, when in a frame mode, inserts the inserted copy protection signal into a frame of the decoded output signal when the received protection present signal is asserted.

27. The multimedia client device of claim 23 wherein the at least one multimedia signal includes a video signal and wherein the decoder, when in a field mode, inserts the inserted copy protection signal into a field of the decoded output signal when the received protection present signal is asserted.

28. The multimedia client device of claim 23 wherein the decoder decodes the received encoded signal in accordance with one of a Motion Picture Experts Group (MPEG) standard, and a Society of Motion Picture and Television Engineers (SMPTE) standard.

29. The multimedia client device of claim 23 wherein the client transceiver receives the RF signal over a broadband wireless access network that conforms to at least one of the following standards: 802.11x, Ultra Wideband (UWB), and Worldwide Interoperability for Microwave Access (WiMAX).

30. The multimedia client device of claim 23 wherein the inserted copy protection signal has a type indicated by a copy protection type included in the received protection present signal.

31. The multimedia client device of claim 23 wherein the inserted copy protection signal has a type, based on a format of the decoded output signal.

32. A method for use in a multimedia server, the method comprising:
asserting a protection present signal in the multimedia server when at least one multimedia signal includes a copy protection signal;
generating an output signal with the copy protection signal removed in the multimedia server when the protection present signal is asserted;
encoding the output signal to produce an encoded signal in the multimedia server;
generating a radio frequency (RF) signal in the multimedia server that includes the encoded signal and the protection present signal;
wirelessly transmitting the RF signal from the multimedia server to a multimedia client.

33. The method of claim 32 wherein the at least one multimedia signal includes a video signal and the copy protection signal is implanted in a vertical blanking interval of the video signal.

34. The method of claim 32 wherein the copy protection signal includes a one of a Macrovision protection signal, High-Bandwidth Digital Content Protection (HDCP) protection signal and a Copy Generation Management System Analogue (CGMS-A) protection signal.

35. The method of claim 32 wherein the at least one multimedia signal includes a video signal and wherein the step of asserting asserts the protection present signal when a frame of the video signal includes a copy protection signal, the step of generating the output signal removes the copy protection signal from the frame of the output signal, and the step of encoding encodes the frame of the output signal to produce a frame of the encoded signal.

36. The method of claim 32 wherein the at least one multimedia signal includes a video signal and wherein the step of asserting asserts the protection present signal when a field of the video signal includes a copy protection signal, the step of generating the output signal removes the copy protection signal from the field of the output signal, and the step of encoding encodes the field of the output signal to produce a field of the encoded signal.

37. The method of claim 32 wherein the step of encoding encodes the output signal in accordance with one of a Motion Picture Experts Group (MPEG) standard, and a Society of Motion Picture and Television Engineers (SMPTE) standard.

38. The method of claim 32 wherein the step of transmitting transmits the RF signal over a broadband wireless access network that conforms to at least one of the following standards: 802.11x, Ultra Wideband (UWB), and Worldwide Interoperability for Microwave Access (WiMAX).

39. The method of claim 32 wherein the step of asserting the protection present signal includes determining a copy protection type and the protection present signal indicates the copy protection type.

40. The method of claim 32 wherein the step of encoding includes transcoding the at least one multimedia input signal.

41. A method comprising:
  receiving and demodulating an RF signal to produce a received encoded signal and a received protection present signal;
  decoding the received encoded signal into a decoded output signal while inserting an inserted copy protection signal when the received protection present signal is asserted.

42. The method of claim 41 wherein the received encoded signal includes a video signal and the step of decoding inserts the copy protection signal in a vertical blanking interval of the video signal.

43. The method of claim 41 wherein the copy protection signal includes a one of a Macrovision protection signal, High-Bandwidth Digital Content Protection (HDCP) protection signal and a Copy Generation Management System Analogue (CGMS-A) protection signal.

44. The method of claim 41 wherein the at least one multimedia signal includes a video signal and wherein the step of decoding, when in a frame mode, inserts the copy inserted protection signal into a frame of the decoded output signal when the received protection present signal is asserted.

45. The method of claim 41 wherein the at least one multimedia signal includes a video signal and wherein the step of decoding, when in a field mode, inserts the copy inserted protection signal into a field of the decoded output signal when the received protection present signal is asserted.

46. The method of claim 41 wherein the step of decoding decodes the output signal in accordance with one of a Motion Picture Experts Group (MPEG) standard, and a Society of Motion Picture and Television Engineers (SMPTE) standard.

47. The method of claim 41 wherein the step of receiving receives the RF signal over a broadband wireless access network that conforms to at least one of the following standards: 802.11x, Ultra Wideband (UWB), and Worldwide Interoperability for Microwave Access (WiMAX).

48. The method of claim 41 wherein the inserted copy protection signal has a type indicated by the received protection present signal.

49. The method of claim 41 wherein the inserted copy protection signal has a type, based on a format of the decoded output signal.

* * * * *